United States Patent

Kashiwagi et al.

Patent Number: 6,063,869
Date of Patent: *May 16, 2000

[54] GOLF BALL

[75] Inventors: Shunichi Kashiwagi; Yasushi Ichikawa; Rinya Takesue, all of Chichibu, Japan

[73] Assignee: Bridgestone Sports Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/967,823

[22] Filed: Nov. 12, 1997

[30] Foreign Application Priority Data

Nov. 11, 1996 [JP] Japan .................................. 8-314298

[51] Int. Cl.[7] .............................. A63B 37/12; C08L 33/02
[52] U.S. Cl. .......................... 525/194; 525/196; 525/201; 525/221; 473/372; 473/378; 473/385
[58] Field of Search ..................................... 525/194, 196, 525/201, 221; 473/372, 378, 385

[56] References Cited

U.S. PATENT DOCUMENTS 5,120,791  6/1992  Sullivan .................................. 525/196

FOREIGN PATENT DOCUMENTS 281145  12/1986  Japan .
207343   8/1989  Japan .
 31956   9/1997  WIPO .

*Primary Examiner*—David Buttner
*Attorney, Agent, or Firm*—Sughrue, Mion, Zinn, Macpeak & Seas, PLLC

[57] ABSTRACT

In a golf ball comprising a core and a cover, the cover is predominantly constructed of a blend of (A) a coordination ionic copolymer of a divalent metal ion crosslinked form of an ethylene/unsaturated carboxylic acid/unsaturated carboxylate terpolymer and an amine compound and (B) a metal ion crosslinked form of an ethylene/unsaturated carboxylic acid copolymer. The ball has improved restitution and feel.

5 Claims, No Drawings

GOLF BALL

TECHNICAL FIELD

This invention relates to golf balls including solid golf balls and wound golf balls, having improved restitution and a soft hitting feel.

BACKGROUND

As the cover stock of two-piece golf balls and wound golf balls, ionomer resins which are metal ion crosslinked forms of ethylene/unsaturated carboxylic acid copolymers have been widely used and accepted because of their restitution, long-lasting impact resistance and cut resistance. Since the ionomer resins provide hard hitting feel and high hardness as compared with the balata rubber conventionally used as the cover stock, ionomer covered golf balls are said difficult to impart a desired spin rate on iron shots and hence, difficult to control.

As a solution to such problems, Sullivan, U.S. Pat. No. 4,884,814 or JP-A 308577/1989 discloses to blend a soft ionomer resin that is a metal ion crosslinked form of an ethylene/unsaturated carboxylic acid/unsaturated carboxylate terpolymer with a metal ion crosslinked form of an ethylene/unsaturated carboxylic acid copolymer. There is obtained a golf ball which is improved in hardness, hitting feel and control.

The metal ion crosslinked form of an ethylene/unsaturated carboxylic acid/unsaturated carboxylate terpolymer, however, is less resilient. Using its blend with a metal ion crosslinked form of an ethylene/unsaturated carboxylic acid copolymer as a cover stock is not effective for adding to the distance of a golf ball.

SUMMARY OF THE INVENTION

An object of the invention is to provide a novel and improved golf ball which is improved in restitution, hitting feel, and control.

The present invention is directed to a golf ball comprising a core and a cover enclosing the core. The cover is predominantly constructed of a blend of (A) a coordination ionic copolymer of a divalent metal ion crosslinked form of an ethylene/unsaturated carboxylic acid/unsaturated carboxylate terpolymer and an amine compound having at least two primary or secondary amino groups and (B) a metal ion crosslinked form of an ethylene/unsaturated carboxylic acid copolymer. The core may be either a solid core or a wound core. The golf ball of the invention is thus formed as either a solid golf ball or a wound golf ball.

Using a specific blend as the cover stock, there is obtained a golf ball which features a pleasant hitting feel, the ease of control, and improved restitution or resilience.

BEST MODE FOR CARRYING OUT THE INVENTION

According to the present invention, a golf ball is prepared by forming a cover composed mainly of a blend of components (A) and (B) around a solid or wound core. Component (A) is a coordination ionic copolymer of a divalent metal ion crosslinked form of an ethylene/unsaturated carboxylic acid/unsaturated carboxylate terpolymer and an amine compound having at least two primary or secondary amino groups, and component (B) is a metal ion crosslinked form of an ethylene/unsaturated carboxylic acid copolymer.

First the coordination ionic copolymer (B) is described. In the divalent metal ion crosslinked form of an ethylene/unsaturated carboxylic acid/unsaturated carboxylate terpolymer, the unsaturated carboxylic acid may be selected from acrylic acid, methacrylic acid, itaconic acid, fumaric acid, etc. The unsaturated carboxylate may be selected from esters having about 4 to about 12 carbon atoms such as methyl acrylate, ethyl acrylate, isobutyl acrylate, n-butyl acrylate, and 2-ethylhexyl acrylate, with the isobutyl acrylate being especially preferred. The divalent metal ions used herein include Zn, Mg, Co, Ni, Cu, and Pb ions.

The content of unsaturated carboxylic acid is preferably about 0.5 to 15% by weight of the terpolymer. Less than 0.5% of unsaturated carboxylic acid would inhibit to produce a golf ball having high restitution attributable to diamine modification. More than 15% of unsaturated carboxylic acid would increase hardness, resulting in a golf ball having poor hitting feel and control. An appropriate content of unsaturated carboxylate is about 5 to 45%, especially 8 to 30% by weight. Less than 5% of unsaturated carboxylate would fail to provide a fully flexible composition. More than 45% of unsaturated carboxylate would give a too flexible composition, detracting from restitution and scuff resistance upon shots.

It is preferred that 10 to 90 mol %, especially 30 to 80 mol % of the carboxyl group of unsaturated carboxylic acid is neutralized with the divalent metal ion. A percent neutralization of less than 10 mol % would result in insufficient resilience whereas a percent neutralization of more than 90 mol % would adversely affect the flow upon molding.

The divalent metal ion crosslinked form of an ethylene/unsaturated carboxylic acid/unsaturated carboxylate terpolymer preferably has a Shore D hardness of 30 to 55. A Shore D hardness below 30 would detract from restitution and scuff resistance upon shots whereas a Shore D hardness above 55 lacks flexibility enough to give the ball a soft feel.

Examples of the amine compound having at least two primary or secondary amino groups used herein include 2,5- or 2,6-bis(aminomethyl)bicyclo[2.2.1]heptane, 1,3-bisaminomethylcyclohexane, 1,2-bisaminomethylcyclohexane, 1,4-bisaminomethylcyclohexane, m-xylylene diamine, o-xylylene diamine, p-xylylene diamine, 4,4'-methylenebis-benzeneamine, phenylenediamine, α,ω-bis(3-aminopropyl)-polyethylene glycol ether, diethylene triamine, hexamethylene diamine, 4,7,10-trioxa-tridecane-1,13-diamine, 3,6,9,12-tetraoxa-tetradecane-1,14-diamine, and 6,9-dimethyl-4,7,10-trioxa-tridecane-2,12-diamine.

Of these amine compounds, 1,3-bisaminomethylcyclohexane, 1,2-bisaminomethylcyclohexane, and 1,4-bisaminomethylcyclohexane which are hydrogenated products of m-xylylene diamine, o-xylylene diamine, and p-xylylene diamine, respectively, are preferred because diamine complexed ionomer resins obtained by reacting them are heat resistant and easy to mold. Also, alicyclic diamines having a norbornane skeleton such as 2,5- or 2,6-bis(aminomethyl)bicyclo[2.2.1]heptane are superior to other diamine compounds because resins associated therewith have the advantages of heat resistance, minimized fume and odor upon molding, and easy working.

The amine compound is used in an amount of 8 to 100 mol % based on the carboxylic acid in the divalent metal ion crosslinked form of an ethylene/unsaturated carboxylic acid/unsaturated carboxylate terpolymer. With less than 8 mol % of the amine compound, no golf balls having high restitution would be obtainable. More than 100 mol % of the amine compound has a possibility of bleeding out.

Any desired method may be used to prepare the diamine complex ionomer resin according to the invention. For example, it may be prepared by reacting a terpolymer with a metal compound to form an ionomer resin and melt kneading the ionomer resin with an amine compound, or by melt kneading a terpolymer with an amine complex salt of a metal compound and an amine compound, or by melt kneading a terpolymer, a metal compound and an amine compound at the same time. Melt kneading is carried out above the melting point of the finally formed ionomer resin, typically at a temperature of 150 to 250° C. using an extruder or kneader.

With respect to the metal ion crosslinked form of an ethylene/unsaturated carboxylic acid copolymer (B), the unsaturated carboxylic acid may be selected from acrylic acid, methacrylic acid, itaconic acid, fumaric acid, etc. The metal ions used herein include Na, Li, K, Zn, Mg, Co, Ni, Cu, and Pb ions.

The content of unsaturated carboxylic acid is preferably about 5 to 20% by weight of the copolymer. Less than 5% of unsaturated carboxylic acid would fail to produce a golf ball having high restitution. More than 20% of unsaturated carboxylic acid would form a resin which is less flowing and hence, difficult to mold.

It is preferred that 10 to 90 mol %, especially 25 to 80 mol % of the carboxyl group of unsaturated carboxylic acid is neutralized with the metal ion. A percent neutralization of less than 10 mol % would result in insufficient resilience whereas a percent neutralization of more than 90 mol % would adversely affect the flow upon molding.

The metal ion crosslinked form of an ethylene/unsaturated carboxylic acid copolymer preferably has a Shore D hardness of 55 to 70. A Shore D hardness below 55 would detract from resilience whereas a Shore D hardness above 70 lacks flexibility enough to give the ball a soft feel.

The blend may be obtained by mixing the above-described components (A) and (B) in conventional mixers, for example, closed kneading machines (e.g., Banbury mixer and kneader), single and twin screw extruders.

In one preferred embodiment of the invention, the blend consists of 10 to 90%, especially 25 to 75% by weight of component (A) and 90 to 10%, especially 75 to 25% by weight of component (B). A blend with less than 10% by weight of component (A) would be hard, resulting in an unpleasant hitting feel and difficulty of control on iron shots. A ball with high restitution would not be obtained from a blend with more than 90% by weight of component (A).

The blend should have a Shore D hardness of 44 to 60, especially 46 to 57. A golf ball having a cover of a blend with a Shore D hardness of less than 44 would have poor restitution and receive too much spin upon iron shots. A golf ball having a cover of a blend with a Shore D hardness of more than 60 would suffer from hard feel and difficult control upon iron shots.

The golf ball cover of the invention is made of a cover stock predominantly containing the blend of components (A) and (B) as mentioned above while the cover stock may further contain various additives, for example, dyes, pigments (e.g., titanium dioxide, zinc oxide, and barium sulfate), UV absorbers, antioxidants, and lubricants as well as inorganic fillers (e.g., glass fibers, talc and calcium carbonate).

The golf ball of the invention is composed of a core enclosed with a cover of the above-mentioned cover stock while the core may be either a wound core or a solid core.

In the case of solid golf balls, the solid core may be a single layer or multi-layer core, that is, any of well-known cores may be used. The solid core may be formed of a well-known rubber composition comprising a base rubber, a co-crosslinking agent, and a peroxide by molding it at elevated temperature under pressure. The base rubber used herein may be polybutadiene rubber or a mixture of polybutadiene rubber and polyisoprene rubber, which are commonly used in conventional solid golf balls. The use of 1,4-polybutadiene rubber having at least 90% of a cis structure is preferred for the high restitution purpose. The co-crosslinking agent used herein may be selected from conventional ones, for example, zinc and magnesium salts of unsaturated fatty acids such as methacrylic acid and acrylic acid and esters of unsaturated fatty acids such as trimethylpropane trimethacrylate, which are used in conventional solid golf balls. Zinc acrylate is especially preferred for the high restitution purpose. The co-crosslinking agent is preferably used in an amount of about 15 to 35 parts by weight per 100 parts by weight of the base rubber. Many peroxides are useful although dicumyl peroxide or a mixture of dicumyl peroxide and 1,1-bis(t-butylperoxy)-3,3,5-trimethylcyclohexane is preferred. The peroxide is preferably blended in an amount of about 0.5 to 1 part by weight per 100 parts by weight of the base rubber.

In the rubber composition, there may be blended other conventional additives such as antioxidants and fillers for adjusting specific gravity (e.g., zinc oxide and barium sulfate), if desired. The filler for adjusting specific gravity may be blended in such an amount of 0 to 30 parts by weight per 100 parts by weight of the base rubber as to give a ball weight of not greater than 45.93 grams although the amount of the filler is not limited to this range.

The wound core may be either a liquid center core having thread rubber wound on a liquid center or a solid center core having thread rubber wound on a solid center. These wound cores may be prepared from conventional materials by well-known methods.

In the practice of the invention, a golf ball may be prepared by a conventional molding technique, for example, by molding a cover stock of the above-defined composition around a core. This molding may be accomplished by injection molding the cover stock around a core or by preforming half cups from the cover stock, interposing a core between the half cups and effecting heat compression molding. The injection molding process is selected for solid cores. For wound cores, the compression molding process allowing for molding at relatively low temperature is preferred from the standpoint of the heat resistance of thread rubber.

In the golf ball of the present invention, the cover preferably has a gage (or radial thickness) of 1.0 to 2.5 mm, more preferably 1.2 to 2.1 mm. A cover with a gage of less than 1.0 mm would lack cut resistance upon iron shots whereas a cover with a gage of more than 2.5 mm would result in a golf ball having insufficient restitution.

Like conventional golf balls, the golf ball of the invention is formed with a multiplicity of dimples in the cover surface. After molding, the cover surface is subject to a series of finishing steps including buffing, painting and stamping.

With respect to the overall hardness, the golf ball of the invention should preferably have a distortion of 2.5 to 4.5 mm, especially 2.6 to 4.0 mm under a constant load of 100 kg. A distortion of less than 2.5 mm would be too hard for hitting feel whereas a distortion of more than 4.5 mm would be too soft to ensure restitution and added distance. It is understood that the golf ball of the above-mentioned construction should have a diameter and a weight in accordance with the Rules of Golf.

EXAMPLE

Examples of the present invention are given below by way of illustration and not by way of limitation. All parts are by weight.

Examples 1–6 and Comparative Examples 1–5

Two-piece golf balls (cover gage 2.0 mm, ball diameter 42.7 mm, ball weight 45.2 grams) were prepared by injection molding a cover stock around a spherical solid core, followed by surface treatment and clear paint coating. The solid core was obtained by molding and heat curing the composition shown in Table 1. The cover stock was the resin composition shown in Tables 2 and 3, which was colored with titanium dioxide and dispersant and adjusted to a specific gravity of 0.99.

The cover stock was measured for hardness by press forming the cover stock into a sheet of about 2 mm thick, keeping it at 23° C. for 2 weeks for allowing the resin to crystallize and stabilize, and thereafter, measuring Shore D hardness according to ASTM D-2240.

The ball was examined for hardness, hitting feel and initial velocity. The hardness is expressed by a distortion (mm) of the ball under a load of 100 kg. A greater distortion value indicates that the ball is softer. The hitting feel was rated by an actual hitting test by a panel of professional golfers. The ball was rated "O" for soft feel, "Δ" for somewhat hard, but acceptable feel, and "X" for hard feel shivering the hands. An initial velocity (m/s) was measured according to the measurement method of USGA (or R&A).

The results are also shown in Tables 2 and 3.

TABLE 1

| Core Composition | |
| --- | --- |
| Components | Parts by weight |
| Cis-1,4-polybutadiene rubber (BR01 by Nippon Synthetic Rubber K.K.) | 100 |
| Zinc acrylate | 33.5 |
| Zinc oxide | 10 |
| Barium sulfate | 9.6 |
| Antioxidant | 0.2 |
| Dicumyl peroxide | 0.9 |

TABLE 2

| | | Example | | | | | |
| --- | --- | --- | --- | --- | --- | --- | --- |
| | | 1 | 2 | 3 | 4 | 5 | 6 |
| Composition | Himilan 1605[1] | — | — | — | 25 | — | — |
| | Himilan 1706[2] | 50 | 30 | 70 | 25 | — | — |
| | Himilan AM7315[3] | — | — | — | — | 50 | — |
| | Himilan AM7317[4] | — | — | — | — | — | 25 |
| | Himilan AM7318[5] | — | — | — | — | — | 25 |
| | M6008-4[7] | 50 | 70 | 30 | 50 | 50 | 50 |
| Properties | Shore D hardness | 55 | 53 | 57 | 55 | 59 | 58 |
| | Ball hardness | 2.7 | 2.7 | 2.6 | 2.7 | 2.5 | 2.6 |
| | Hitting feel | O | O | O | O | O | O |
| | Initial velocity | 77.3 | 77.0 | 77.4 | 77.3 | 77.4 | 77.4 |

TABLE 3

| | | Comparative Example | | | | |
| --- | --- | --- | --- | --- | --- | --- |
| | | 1 | 2 | 3 | 4 | 5 |
| Composition | Himilan 1706[2] | 100 | — | 50 | 5 | 95 |
| | Himilan AM7316[6] | — | 100 | 50 | — | — |
| | M6008-4[7] | — | — | — | 95 | 5 |
| Properties | Shore D hardness | 63 | 45 | 54 | 51 | 62 |
| | Ball hardness | 2.3 | 3.0 | 2.7 | 2.7 | 2.3 |
| | Hitting feel | X | O | O | O | X |
| | Initial velocity | 77.4 | 76.5 | 76.9 | 76.8 | 77.4 |

As is evident from Tables 2 and 3, golf balls having improved restitution and a soft pleasant hitting feel are obtained by using as a cover stock a blend of (A) a coordination ionic copolymer of a divalent metal ion crosslinked form of an ethylene/unsaturated carboxylic acid/unsaturated carboxylate terpolymer and an amine compound having at least two primary or secondary amino groups and (B) a metal ion crosslinked form of an ethylene/unsaturated carboxylic acid copolymer in a suitable ratio.

The golf ball of the invention has improved restitution and presents a soft pleasant hitting feel to the player.

Japanese Patent Application No. 314298/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a core and a cover, said cover predominantly comprising a blend of
   (A) a coordination ionic copolymer of a divalent metal ion crosslinked form of an ethylene/unsaturated carboxylic acid/unsaturated carboxylate terpolymer and an alicyclic diamine having a norbornane skeleton and
   (B) a metal ion crosslinked form of an ethylene/unsaturated carboxylic acid copolymer,
   said blend consisting of 10 to 90% by weight of a component (A) and 90 to 10% by weight of component (B).

2. The golf ball of claim 1 wherein said blend has a Shore D hardness of 44 to 60.

3. The golf ball of claim 1 wherein said amine compound having at least two primary or secondary amino groups is 2,5- or 2,6-bis(aminomethyl)bicyclo[2.2.1]heptane norbornane dimethylamine.

4. The golf ball of claim 1 wherein said divalent metal ion crosslinked form of an ethylene/unsaturated carboxylic acid/unsaturated carboxylate terpolymer has a Shore D hardness of 30 to 55.

5. The golf ball of claim 1 wherein said metal ion crosslinked form of an ethylene/unsaturated carboxylic acid copolymer has a Shore D hardness of 55 to 70.

* * * * *